United States Patent

[11] 3,575,588

[72] Inventors Karl Hermann
Vestal;
Warren R. Wrenner, Endicott; Joseph V. Riley, Vestal, N.Y.
[21] Appl. No. 758,474
[22] Filed Sept. 9, 1968
[45] Patented Apr. 20, 1971
[73] Assignee International Business Machines Corporation
Armonk, N.Y.

[54] ELECTRON BEAM CIRCUIT PATTERN GENERATOR FOR TRACING MICROCIRCUIT WIRE PATTERNS ON PHOTORESIST OVERLAID SUBSTRATES
5 Claims, 4 Drawing Figs.

[52] U.S. Cl. .................................................... 235/151.1, 174/68.5, 355/53
[51] Int. Cl. .................................................... G03b 27/42, H05k 3/00
[50] Field of Search ........................................ 235/151, 151.1, 198; 355/53, 54; 29/(Inquired); 346/110, (Inquired); 95/(Inquired); 174/68.5; 317/101

[56] References Cited
UNITED STATES PATENTS

| | | | |
|---|---|---|---|
| 3,442,587 | 5/1969 | Croucher et al. ............. | 355/54 |
| 3,461,347 | 8/1969 | Cemelson..................... | 174/68.5X |
| 3,465,091 | 9/1969 | Bradham III.................. | 174/68.5 |
| 3,495,512 | 2/1970 | Vaughan...................... | 355/46X |

*Primary Examiner*—Malcolm A. Morrison
*Assistant Examiner*—Joseph F. Ruggiero
*Attorneys*—Hanifin and Jancin and Andrew Taras

ABSTRACT: The tracing of microcircuit wire patterns on photoresist overlaid substrates (circuit boards) by means of an electron beam. Pattern tracing is achieved by controlling the deflection of the beam in conjunction with the oscillatory motion of the substrate mounted on an oscillating stage. A feedback system from a grating on the stage provides synchronized pulses to a clock which in conjunction with the control data derived from a computer, provides control information for a desired circuit pattern.

*INVENTORS*
KARL HERMANN
WARREN R. WRENNER
JOSEPH V. RILEY

BY Andrew Taras
*AGENT*

PATENTED APR 20 1971 3,575,588

SHEET 2 OF 3

ELECTRON BEAM CIRCUIT PATTERN GENERATOR FOR TRACING MICROCIRCUIT WIRE PATTERNS ON PHOTORESIST OVERLAID SUBSTRATES

BACKGROUND OF THE INVENTION

The prior art is replete with a variety of circuit pattern generators which employ various types of sweep control circuits for deflecting an electron beam under control of a computer. A disadvantage of these systems, however, lies in the fact that a considerable amount of input control data is required and this, of course, necessitates extremely large size data storage facilities. The necessity for the large amount of input data is prompted by the fact that the circuit patterns are formed solely by the manipulation and control of the electron beam upon a stationary circuit board.

SUMMARY OF THE INVENTION

The present invention is directed to a system which does not require the massive data storage facilities. This is due largely to the use of an oscillating stage upon which the substrate, or circuit board, is mounted in conjunction with a feedback system which reduces the amount of computer control data required for control of beam sweep and deflection. One of the principle features of the invention is predicated on the use of the oscillating stage on which the circuit board is mounted whereby a variety of different circuit patterns may be obtained under control of a limited number of predefined beam sweeps which afford a high degree of accuracy in beam position and constant energy during the entire period of the circuit trace.

In the system under consideration here, the beam's energy is exploited as a polymerizing agent for photoresist materials. The conventional methods of fabricating integrated circuits on wafers, circuit boards, substrates, or the like, involves placing of predetermined patterns on these devices. This is usually accomplished by coating the device with a thin layer of photoresist material and exposing it to light via a mask. Preparation of the desired masks is a lengthy and tedious process. Since each device usually contains many repeat patterns, "step and repeat" techniques are usually employed. An integrated circuitry wafer, for example, generally consists of active elements, resistors plus capacitors, and interconnect wires. Thus at least three different masks are required. The necessity to place these masks in accurate registration with respect to each other is obviously essential. As long as the yield of active elements on a wafer is not 100 percent, the selection of good elements requires custom-made interconnect masks.

The system herein described overcomes many of the cited difficulties. Mask preparation is replaced by writing an appropriate program on magnetic tape, which is a much simpler and less tedious effort, and mask registration is replaced by accurate placement and control of the electron beam on predetermined areas, known as streets, on the circuit board.

OBJECTS

It is the principle object to provide a circuit pattern generating system which is more reliable and accurate than prior art systems.

Another object is to provide a computer-controlled circuit pattern generating system which requires considerably less control data than the prior art systems.

A more specific object is to provide a unique computer-controlled circuit pattern generating system which combines mechanical oscillatory motion of a circuit board with the sweep of an electron beam to provide a highly efficient and accurate system.

Yet a more specific object is to provide a computer-controlled circuit pattern generating system coupled with a feedback from a stage which oscillates the circuit board upon which the sweep of the beam impinges to provide a variety of circuit patterns under the control of systems which require less data storage facilities than prior art systems.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 1 is a schematic arrangement of the electron beam generating system for generating waveform patterns on coated circuit boards, substrates, or the like.

FIG. 3 shows various waveform patterns produced by the electron beam generating system.

DESCRIPTION OF PREFERRED EMBODIMENT

Figures 1, 3:
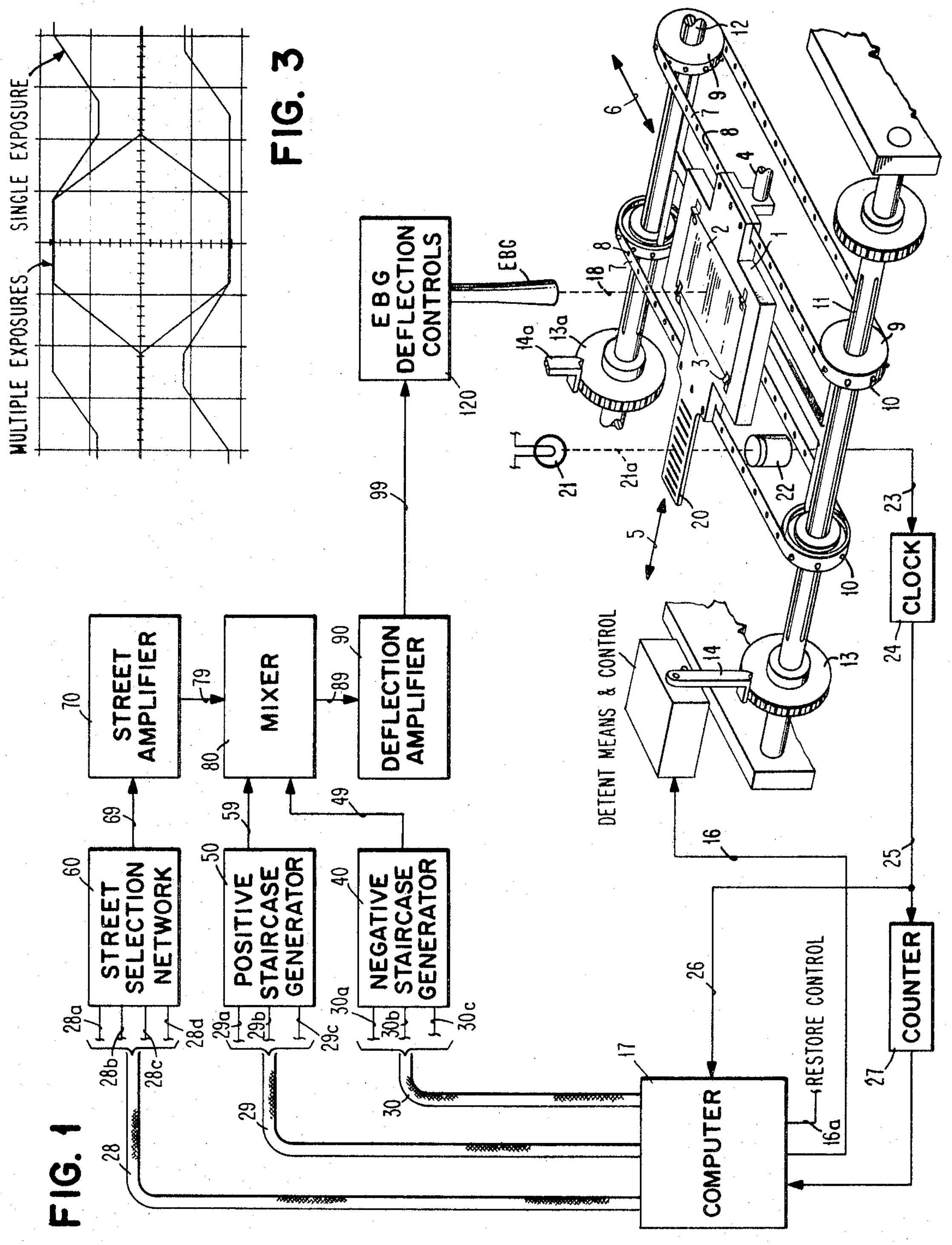

Referring to FIG. 1, the system, as schematically shown, comprises a stage 1 on which a circuit board 2 is clamped by suitable clamping means 3. The stage 1 is supported for oscillatory motion in one direction, along an *x–x* axis, by suitable means not shown. The stage 1 is connected by means of a shaft 4 to a linear motor means not shown, but well known in the art, as for example, any motor means employing the slider crank mechanism arrangement schematically shown in FIGS. 25 and 29 on pages 24 and 26 in a text entitled "Mechanics of Machinery" by C. W. Ham and E. J. Crane, published in 1948 by McGraw-Hill Book Co., Inc. that provides the motion to oscillate the stage along the *x–x* axis as indicated by arrow 5. The stage 1 is further positioned along a *y–y* axis, as indicated by arrow 6, by means of a pair of flexible metal tapes 7 having spaced perforations 8 engaged by sprocket pins 10 carried on the periphery of each of a plurality of sprocket wheels 9 slidably carried on fluted shafts 11 and 12. The fluted shafts are angularly positioned by means of a drive gear 13 under control of a drive pawl 14 actuated by a drive and detent means 15 which is electrically actuated under control of an advance drive signal issued from the computer 17 by way of an advance control line 16. The actuation of the drive pawl 14 results in moving the stage 1 along the *y–y* axis, to one of a plurality of street level positions. After a street position is assumed, oscillatory motion of the stage 1 is initiated, and at an appropriate point in time, the electron beam 18 is directed to impinge upon the substrate secured to the stage 1 for the tracing of a desired waveform as determined by data signals transmitted from the computer 17. The manner of controlling the system for developing the desired waveforms will be explained hereinafter at a more appropriate time.

It may thus be appreciated that the tracing of desired waveforms for each street position on the substrate takes place after a specified street location has been positioned by the drive means explained under control of the advance control signal.

Upon completion of the last beam trace, the printed substrate, or the like, is removed and the stage 1 is returned to its initial starting position by means of a drive pawl arrangement, similar to that described for the positioning of street locations, which is controlled by a signal on line **16*a*. For purposes of simplicity, the arrangement for restoring the stage to its initial position is not shown except for a portion of the drive pawl 14*a* which cooperates with the drive gear 13*a***. Although not disclosed the substrate, or the like, is maintained in a gas free environment, for example, a vacuum chamber.

An arrangement for obtaining synchronized clock pulses for the system is derived from the following arrangement: a grating 20 is secured to the stage 1 and above the grating is positioned a suitable light source 21 which, when turned on, projects a light beam **21*a* through the grating and onto a light-responsive cell 22 which issues a voltage signal each time that the light beam 21*a* is intercepted by the grating. This voltage signal is transmitted through a line 23 to a clock pulse generator 24 which is of a type well known in the art. The clock generator provides the basic clock signals to the system by way of lines 25 and 26**.

The circuit arrangement, as schematically shown in FIG. 1, includes the following units: a negative staircase generator 40, a positive staircase generator 50, a street selection network 60 interconnected with a street amplifier 70, a mixer 80, a deflection amplifier 90, and the deflection controls 120 of an electron beam generator EBG.

Control and data signals from the computer 17 are transmitted to the negative staircase generator 40, the positive staircase generator 50, and the street selection network 60 by way of cables 28, 29, and 30. The cable 28 comprises input lines 28*a*, 28*b*, 28*c*, and 28*d*. The cable 29 comprises input lines 29*a*, 29*b*, and 29*c*, and cable 30 comprising input lines 30*a*, 30*b*, and 30*c*.

An output from either the negative staircase generator 40 or the positive staircase generator 50 is transmitted respectively through output lines 49 and 59 to the mixer 80 which further receives an amplified street signal from the line 79, the latter signal being derived from the street selection network 60 by way of line 67 connected to the street amplifier 70.

The mixer output is passed through a line 89 connected to the deflection amplifier 90, through output line 99 connected to the deflection controls 120. It may thus be appreciated that various combinations of positive staircase voltages, negative staircase voltages, and street selection signals provide a beam control voltage which positions the EBG beam during oscillations of the substrate upon which the beam impinges.

Figure 2A:
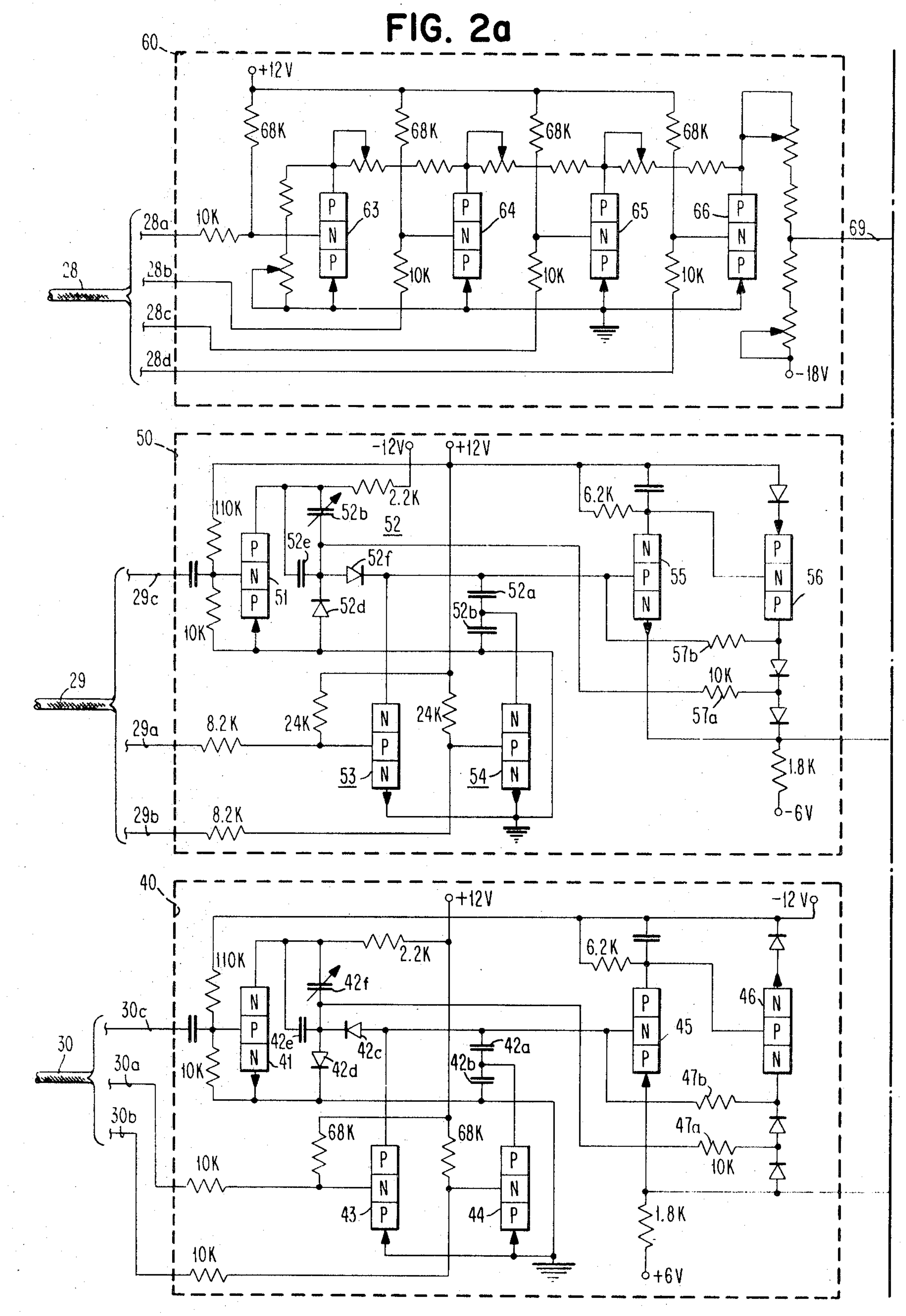
FIGS. 2*a* and 2*b*, when taken together, represent a circuit diagram for developing the waveform patterns.

The manner in which the above units function will now be explained. Refer to FIG. 2*a*. In view of the similarities of the staircase generators 40 and 50, only the positive staircase generator 50 will be explained. The positive staircase generator 50 comprises essentially an input switching transistor 51 and a diode capacitor pump network 52 consisting essentially of pump capacitors 52*a* and 52*b*, diodes 52*c*, 52*d*, capacitors 52*e* and 52*f*, and transistors 53, 54, 55, and 56, all interconnected in the manner shown. Inputs to the generator 50 consist of the clock input line 29*c*, the step height control line 29*b*, and the staircase return line 29*a*.

For each clock signal applied, a differentiated clock signal appears at the base of transistor 51 to cause the latter to conduct, thereby impressing a voltage excursion across the staircase capacitor pump network 52, specifically across the capacitors 52*a* and 52*b*.

When the step height control line 29*b* is impulsed by a voltage signal of 6 volts, transistor 54 is turned ON. The magnitude of the charge on the pump network, when transistor 54 is OFF, yields a voltage *V* which is equal to a value determined by the following relationship:

$$V\,\frac{C_{52e}}{C_{52e}+C_{sc}}\;\frac{1}{C_{sc}}=\frac{1}{C_{52a}}+\frac{1}{C_{52b}}$$

wherein $C$ is capacitance, $C_{52e}$ is the capacitance across capacitor 52*e* and $C_{sc}$ is the total capacitance of the reciprocal capacitances across the capacitors 52*a* and 52*b*.

When transistor 54 is in the OFF state, the magnitude of the voltage on the pump network yields a voltage *V* which is equal to a value determined by the following relationship:

$$V\frac{C_{52e}}{C_{52e}+\frac{C_{52a}C_{52b}}{C_{52a}+C_{52b}}}$$

wherein $C_{52e}$, $C_{52a}$, and $C_{52b}$ represent the capacitance respectively of the capacitors 52*e*, 52*a*, and 52*b*.

The charge on the pump network is returned to its initial ground state by turning ON transistor 53 after a predetermined number of clock pulses have been generated by means of a counter 27 under control of the clock 24.

To minimize drain on the staircase charge capacitors, an impedance transformation network is utilized and includes the transistors 55 and 56, a resistor 57*b* which maintains the high input impedance of transistor 55 and a resistor 57*a* which maintains constant charge on the capacitor network.

MIXER

The mixer 80 comprises a resistor mixer network connected to a pair of temperature compensated emitter follower transistors 84 and 86 interconnected in complementary fashion. The resistor network includes resistors 81*a*, 81*b*, and 81*c* interconnected to a common terminal 81*d*. The latter, in turn, is connected to a second resistor network which includes variable resistors 82*a* and 82*b*, interconnected by way of resistors 83*a* and 83*b* to +6-volt and −6-volt sources respectively.

Voltage variations due to temperature changes in the first transistor 84 are canceled by similar voltage variations due to temperature changes in the second transistor 86. Planar transistors have been utilized because of their close tracking with temperature variations, this characteristic being further enhanced by virtue of the complementary configuration of these transistors which yield high stability. The output of the mixer provides a composite voltage waveform, which after suitable amplification, is utilized to energize the electron beam deflection coil 120 to control the beam sweep across the circuit board.

STREET SELECTION NETWORK

The street selection network 60 is utilized to generate five different street voltage levels which are amplified, by means of the amplifier 70, and transmitted to the mixer 80 where they are combined with voltages derived from the positive and negative generators 50 and 40.

The street selection network 60 is essentially a precision network which includes 4 transistors 63, 64, 65, and 66 interconnected in the divider network as shown. Any of the 5 different voltage levels can be obtained by shorting the appropriate portion of the divider network to ground by turning on the appropriate one of said transistors. Alloy transistors have been utilized in view of their relatively low saturation voltages. Input to the network 60 is derived from the computer 17 by way of the lines 28*a*, 28*b*, 28*c*, and 28*d* passing through the cable 28. Output from the network 60 is by way of the line 69 connected to the street amplifier 70.

STREET AMPLIFIER

The street amplifier 70 is essentially a parallel arrangement of five transistors 72, 73, 74, 75, and 76 driven by an input transistor 71 connected in a network having a large feedback and a complementary input. The parallel arrangement minimizes the power developed in each transistor and the complementary feedback maintaining temperature stability. The output of the network 70 is by way of the line 79 connected to the mixer 80.

DEFLECTION AMPLIFIER

The deflection amplifier 90 consists essentially of a control section, an amplifier section, and an output stage. This control section consists of a network which includes, among other components, transistors 91, 92, 93, 94, and control potentiometers 100, 101, and 102 for controlling gain, beam position, and balance respectively. The amplifier section includes transistors 95 and 96 and the output section, transistors 97 and 98. The control section provides variable gain and beam position controls which are substantially free of interaction. The gain is a function of the potential difference existing between the emitters of transistors 92 and 93 and is not affected by changes in beam position control. The complementary configuration of these transistors provides for temperature stability. The transistors 95 and 96 in the amplifier section are connected in a complementary configuration which enables the latter to be used with a single-ended input. The configuration further eliminates crossover distortion normally present at low signal levels. The output of the amplifier section is derived by means of connections from the emitters of transistors 95 and 96 to the bases of transistors 97 and 98 whose commonly connected emitters provide the amplifier output to the line 99 which is connected to the deflection coil 120 of the electron beam generator EBG.

Figure 2B:
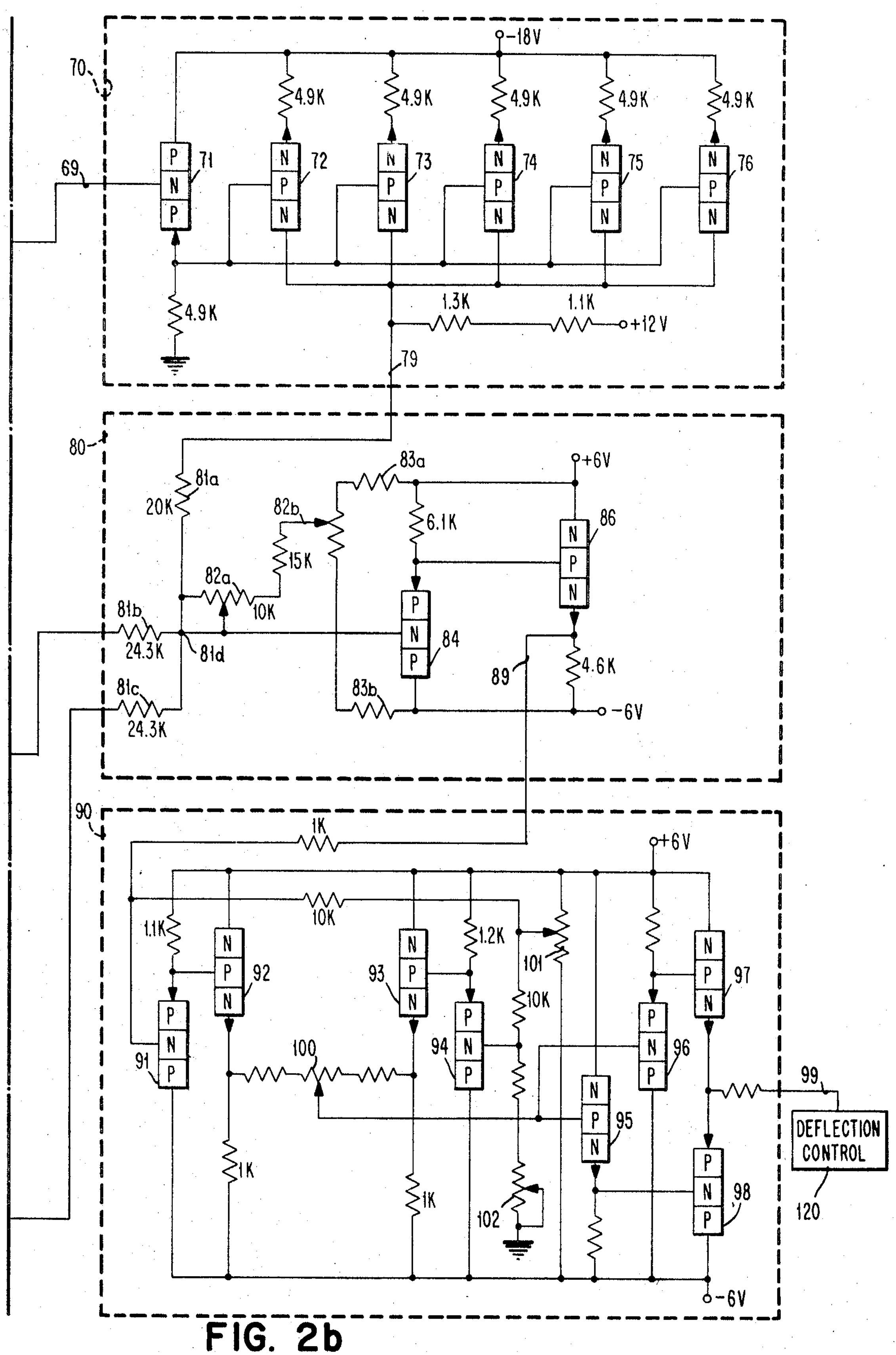

In the circuit diagram of FIGS. 2*a* and 2*b*, all resistors are one-half watt unless otherwise noted, and all capacitors are in microfarads unless otherwise noted.

One of the principle features of this system is the deflection control circuitry that provides precise displacement of the electron beam to form various waveform patterns of which some are illustrated in FIG. 3. These waveform patterns are developed by mixing any of five precise DC voltage levels with the positive and negative staircase generated voltages, which voltages are issued by the computer under control of a taped program which stores all of the control data for generating desired waveform patterns.

In the drawing of FIG. 3, any of the light horizontal lines are generated under control of the street control signals applied to the street selection network 60 via the control lines 28*a*—28*d*. The heavy horizontal lines are the result of multiple exposures where different patterns are terminated on the same street level. Slanting lines are the result of different combinations of control voltages, derived from the computer, applied to the positive staircase generator 50 and the negative staircase generator 40 via the control lines 29*a*—29*c* and 30*a*—30*c* respectively. The slope of the slanting lines is a function of the speed of the oscillating stage 1, which carries the circuit board, which provides the clock signals to the system. The extent of the slanting lines is a function of the counter 27 and a predetermined count value that is programmed into the computer.

While the invention has been particularly shown and described with reference to a preferred embodiment thereof, it will be understood by those skilled in the art that various changes in form and details may be made therein without departing from the spirit and scope of the invention.

We claim:

1. A circuit pattern generator for tracing a waveform pattern on an emulsion side of a circuit board, or the like, comprising:

mechanical means for oscillating said circuit board, an electron beam focused on the emulsion side of said circuit board, deflection control means for deflecting said beam, voltage generating means including a street selection network for generating street level voltage, a staircase voltage generator for producing positive and negative staircase voltages, a mixer for mixing said staircase voltages with a desired street level voltage and issuing a deflection output voltage to said deflection control means to cause deflection of said beam during oscillations of said circuit board to produce a desired waveform pattern in the emulsion side of said circuit board, and synchronizing means synchronizing the oscillating movements of said circuit board with the issuance of said deflection output voltage.

2. A circuit pattern generator as in claim 1 further including a clock connected to said synchronizing means for providing clock pulses to said voltage generating means for effecting the synchronization between the oscillations of said circuit board and the deflections of said beam.

3. A circuit pattern generator as in claim 2 further including a computer interconnected with said clock and said voltage generating means for selectively applying street level voltages with selected positive and negative staircase voltages to produce different desired waveform patterns on different selected street areas of said circuit board.

4. A circuit pattern generator as in claim 3 further including a counter interconnected between said clock and said computer to provide the latter with a count of the number of clock pulses issued during an oscillation of said circuit board.

5. A circuit pattern generator as in claim 4 further including voltage return control means for said staircase generators and means under control of said computer to apply control signal for energizing said voltage return control means.